United States Patent [19]

Varouxis et al.

[11] Patent Number: 5,027,139
[45] Date of Patent: Jun. 25, 1991

[54] STROBE, LIGHTMETER AND TRAY ASSEMBLY FOR UNDERWATER CAMERAS

[76] Inventors: Alexander T. Varouxis; Edward J. Carafa, both of 822 N. Henry St., Alexandria, Va. 22314

[21] Appl. No.: 436,749
[22] Filed: Nov. 15, 1989
[51] Int. Cl.⁵ .............................................. G03B 17/08
[52] U.S. Cl. ......................................... 354/64; 354/82
[58] Field of Search ................. 354/64, 82, 126, 145.1

[56] References Cited

U.S. PATENT DOCUMENTS

| | | | |
|---|---|---|---|
| 3,999,055 | 12/1976 | Wakahara et al. | 354/126 X |
| 4,187,021 | 2/1980 | Balser | 354/82 X |
| 4,191,461 | 3/1980 | Mittleman et al. | 354/64 |
| 4,218,122 | 8/1980 | Drafahl et al. | 354/64 X |
| 4,752,794 | 6/1988 | Bohannon | 354/126 |

Primary Examiner—Brian W. Brown
Attorney, Agent, or Firm—James Creighton Wray

[57] ABSTRACT

A tray for supporting an underwater camera incorporates a quickly detachable and attachable light strobe on one side of the camera and allows for the alternative attachability of a second strobe or a mast-mounted lightmeter opposite the quickly detachable strobe; and subsequently, provides plural hand grips for maneuverability of the camera and the subject, accessibility and maneuverability of complementary equipment, and stability and equilibrium of the camera to prevent off-center photographs. A bar or post protrudes perpendicularly upward from the tray parallel to a side of the camera. A non-rotatable seat for a strobe arm attachment incorporates a slot ground crosswise in the platform adjacent the protruding post. The post is secured to the tray in the center of the slot.

9 Claims, 2 Drawing Sheets

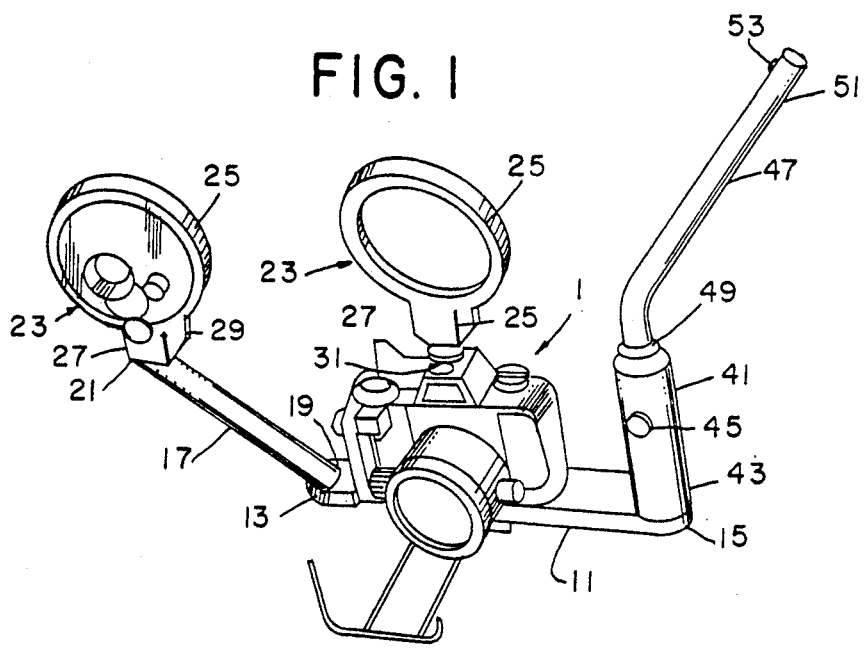
FIG. 1
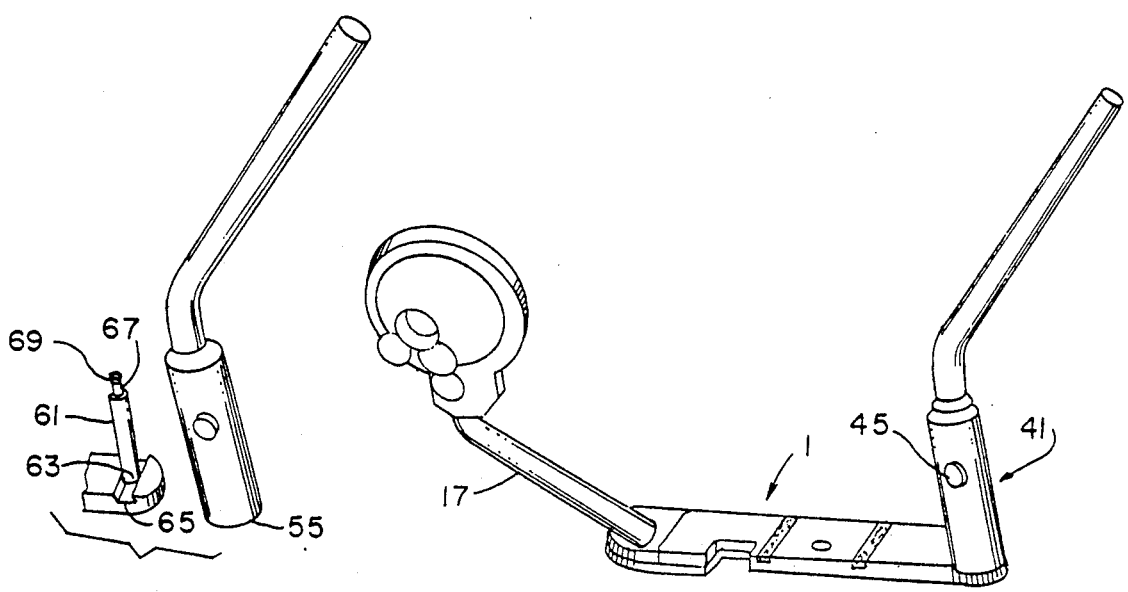
FIG. 3
FIG. 2

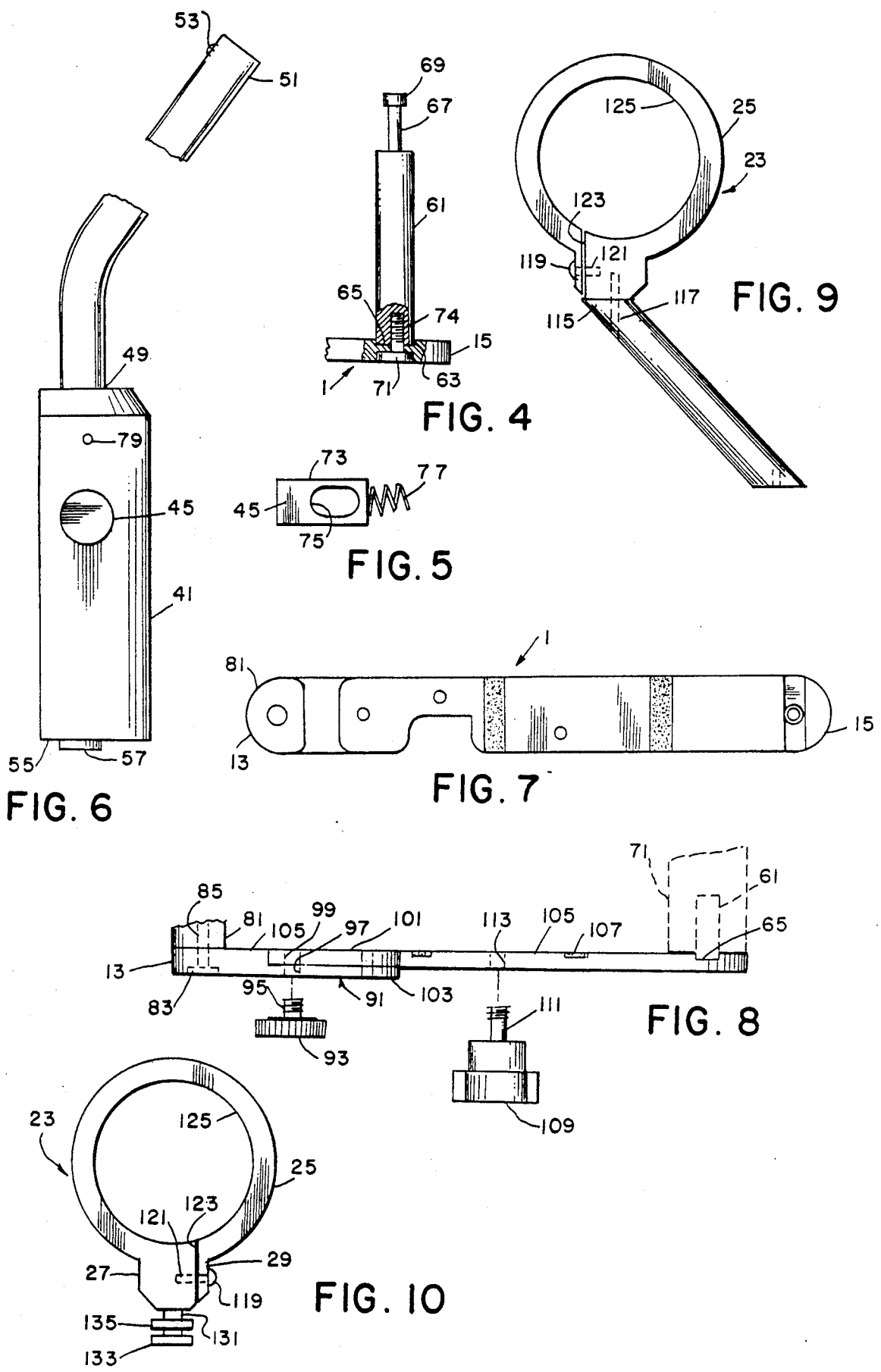

1

STROBE, LIGHTMETER AND TRAY ASSEMBLY FOR UNDERWATER CAMERAS

BACKGROUND OF THE INVENTION

This invention relates to attachments for cameras, particularly accessories for underwater photography.

Several problems arise when a photographer attempts to take photographs underwater. Probably the foremost limitation as imposed by underwater conditions is time. Whether scuba diving or snorkeling, the photographer has a limited amount of oxygen and time, to find a subject, create the right conditions and take the picture before returning for air. As experienced photographers know, the right subject and conditions are difficult to find, and when they are found, time cannot be wasted needlessly adjusting inferior equipment. These problems bring about the need for attachments for sophisticated underwater equipment which take into consideration the need for time efficiency, mobility and availability of camera attachments and accessories.

The prior art has attempted to solve these problems of underwater photography by attaching an underwater camera to a tray or base to which attachments are affixed. The tray, or an attachment, can also act as a handle and adds stability in a nearly weightless environment. It is known art for strobes and light sources to be mounted on the end of a mast or a bar which has another end attached to the tray. However, these attachments to the trays are commonly screw type mechanisms which require the use of two hands, take valuable time away at critical moments, and can be lost easily when removed. Therefore, there is a need for a quicker and more efficient method of releasing and replacing the strobe from the tray in order to vary exposure and angles of the light provided.

U.S. Pat. Nos. 3,999,055, 4,191,461 and 4,752,794 all show quick release mechanisms for strobes. U.S. Pat. No. 3,999,055 shows a flashlight unit for mounting to a base which attaches to a camera and protrudes from one side of the camera. A quick release button disengages the strobe from a post protruding from the tray. The tray does not allow for the engagement of other attachments.

U.S. Pat. No. 4,191,461 is a camera jig for underwater stereoscopic photography wherein the camera is mounted in a large frame-like structure which incorporates a strobe or light source being detachably mounted behind the camera. The mounting is a quick release lock. However, the invention as disclosed is burdensome and would not allow the mobility of the present invention.

U.S. Pat. No. 4,752,794 is a camera and light grip assembly which is quickly detachable from a tray for a camera. The tray and light grip assembly are provided so that other accessories may be interchangeable. The disclosure does not allow for the extension of the tray so as to include further accessories and thus, does not provide more efficiency, accessibility and stability to the system.

U.S. Pat. No. 4,218,122 is a camera tray incorporating plural lights, one on each side of the tray. However, the lights are not quickly detachable as in the present invention.

A need exists for quick and convenient underwater camera attachments for strobes and lightmeters.

SUMMARY OF THE INVENTION

The present invention provides a tray for supporting an underwater camera. The tray incorporates a quickly detachable and attachable light strobe on one side of the camera and allows for the alternative attachability of a second strobe or a mast-mounted light meter opposite the quickly detachable strobe; and subsequently, provides plural hand grips for maneuverability of the camera and the subject, accessibility and maneuverability of complementary equipment, and stability and equilibrium of the camera to prevent off-center photographs. Other objects and improvements of the present invention will be described in the ongoing specification.

Briefly, the present invention is a tray and attachments for an underwater camera. Preferably the tray or base is of a flattened rectangular structure of a width roughly equivalent to that of the camera and a length longer than that of the bottom of the camera. The camera is releasably attached to an attachment means proximal to the center point of the length of the tray, thereby providing tray ends protruding from each end of the camera. The protruding ends of the tray create platforms for engaging attachments and accessories for underwater photography.

In the preferred embodiment, the first platform incorporates a bar or post which protrudes perpendicularly upward from the tray parallel to a side of the camera. Adjacent this post is a nesting means for providing a nonrotatable seat for a strobe arm attachment. The preferred nesting embodiment incorporates a slot ground crosswise in the platform adjacent the protruding post. It is preferable that the post be secured to the tray relative to the center of the slot; however, the post may be an integral part of the tray. At some point along its length, the post is provided with a circumferential indentation.

The strobe attachment is essentially an arm having a handle end and a strobe attachment end. The handle end of the strobe attachment is preferably a circular or semi-circular knurled cylinder slightly longer than the post. The handle incorporates a protrusion complementary to the slot on the tray. An axial bore slightly longer than the post and corresponds to the post diameter. The handle has a traverse radial bore drilled at a length from its end corresponding to the height of the circumferential indentation from the base of the tray. A locking mechanism is provided within the radial bore for automatically engaging the indentation on the post through a spring, slide and button type arrangement protruding from the axial bore.

The strobe attachment engages with the tray by sliding the post into the bore hole in the handle and aligning the handle protrusion with the tray slot, thus seating the end of the handle in its proper position. The spring locking arrangement engages the circumferential indentation in the post, and thus, attaches the strobe attachment to the camera tray. To release the attachment, the user simply exerts inward pressure on the button on the handle which compresses the spring and disengages the sliding locking mechanism from the circumferential indentation on the post. This allows the user to slide the handle off the post. The quick disengagement of the strobe attachment saves time for other underwater photographic activities and is a primary object of this invention.

The present invention also incorporates a second tray end protruding oppositely from the first tray end to enable the attachment of other underwater photographic accessories.

Typically, a light meter as used for underwater photographic activities is attached by a string to the wearer's belt. The present invention incorporates an attachment for the second protruding end of the tray wherein a light meter is mounted on a mast which is attached to the protruding tray. A mounting bracket surrounds the circumference of the light meter and employs a screw mechanism for tightening the fit around the light meter employed. The bracket and light meter are attached to one end of an arm through a threaded post protruding from the bracket and a receiving threaded bore on the arm. The arm abuts flushly at an angle with the tray and has a threaded hole corresponding to a hole drilled central to the protruding portion of the tray. A screw passes upward through the tray and into the arm to tighten the arm onto the tray at an angle as prescribed by the angle of the abutment of the arm with the tray.

An object of the invention is to provide the camera tray with a light meter attachment for mounting an underwater camera tray for easy viewing for allowing the diver to adjust the lighting with the quick release strobe accordingly. The addition of the readily available light meter and quick release strobe enables the user to save time obtaining the right photographic conditions, thus increasing quality and quantity of the pictures taken.

The light meter attachment is provided in one embodiment with a plate at the bottom of its threaded post and a knurled nut threaded on the post. The plate with a shoe at the top of the camera, and the nut is tightened to pull the plate up against the shoe top holding the circumferential light meter mount on the shoe.

Alternatively, the second platform is fitted with a complementary strobe arm which overlaps and extends outwardly from the tray and provides a base for an upwardly extending strobe mast. Thus, an object of the invention is to provide a camera tray with two releasable strobes, wherein one strobe is quickly releasable while the other strobe is releasable through a screw type mechanism.

Both the light meter arm and second strobe arm provide hand holds for the user and, along with the quick release handle on the first strobe arm, provide dual hand holds for the camera. Thus, the user has an option of left handed or right handed grasping of the camera so as to free the convenient hand for manipulating camera settings and equipment and activating the shutter.

Further, the addition of an attachment opposite the first quick release strobe provides more mast equilibrium with respect to the camera so as to provide more efficient centering of the picture.

Alternatively, the threaded attachment hole on the second protruding tray platform could receive the male threads of a quick release post for cooperating with corresponding bores in an arm such as the aforesaid light meter or strobe arms.

These and other objects of the invention will be further detailed and described in the ongoing specification.

BRIEF DESCRIPTION OF THE DRAWINGS

FIG. 1 is a perspective view of the tray attachment incorporating the quickly detachable strobe mast and two embodiments of light meter attachments, showing a camera mounted thereon.

FIG. 2 is a perspective view of the camera tray without the camera.

FIG. 3 is a partial perspective view of the quickly detachable strobe mast platform.

FIG. 4 is a cutaway view of the platform post for the strobe mast.

FIG. 5 is an elevational view of the locking mechanism.

FIG. 6 is an elevational view of the strobe mast showing the locking mechanism.

FIG. 7 is a top view of the tray.

FIG. 8 is a side view of the tray structure showing the camera attachment and extension attachment means.

FIG. 9 is the light meter housing and light meter mast.

FIG. 10 is the light meter housing for attachment to the camera shoe.

DESCRIPTION OF THE PREFERRED INVENTION

The underwater camera tray of the preferred invention is generally indicated by the numeral 1 in FIGS. 1 and 2. The tray 1 has a central portion 11, which attaches to a camera, and end platforms 13 and 15. One platform end 15 for engaging a quickly detachable strobe mast at one side of the camera and a second platform 13 for engaging a second attachment. The second attachment, in FIGS. 1 and 2, is a mast 17 for engaging a housing 23 for a light meter through an engaging means 21 at the abutment of the mast 17 with the housing 23. The housing has an outer peripheral edge 25 which circumscribes the periphery of the meter and holds it therein. The housing 23 can alternatively be mounted on the camera shoe through a shoe engaging means at 31. The housing 23 has a protrusion 27 for engaging of the mast 17 or the shoe of the camera. The housing 23 has an adjustment means 29 on the protrusion for adjusting the housing on the meter and opening the housing for releasing of the meter. Opposite the abutment of the housing and the mast at engaging means 21, the mast abuts and is engaged by the second platform 13 engaging means 19.

The quickly detachable strobe mast 41 incorporates a handle 43 and an upper mast 47. The handle incorporates a release button 45 for detaching the handle 43 from the first platform 15. The handle incorporates a means 49 for engaging the upper mast. The upper mast 47 has a strobe attachment end 51 which incorporates a strobe attachment means at 53.

As shown in FIG. 3, the quickly detachable strobe has a handle end 55 which slides over a post 61 protruding from the second platform wherein a nesting means 65 is adjacent the protruding post 61 for receiving the handle end 55. The post has a circumferential indentation 67 for receiving an engaging means as prescribed by the engaging button 45 and a locking flange 69 at the post end distal from the detachable strobe platform 15.

FIGS. 4, 5 and 6 show the locking means of the detachable strobe wherein FIG. 4 is a cutaway of the protruding post; FIG. 5 is the handle button and integral engagement means; and FIG. 6 is the button in placed in the mast and nesting protrusion for abutment with the platform. In FIG. 4, the tray 1 has a detachable strobe end 15 incorporating a post 61, protruding substantially perpendicular from the platform wherein the post is connected to the platform through a screw 71 threaded into a bore hole 74 in an end of the post 63 proximal the abutment. The proximal post end 63 has a diameter substantially equivalent to a nesting means 65, which is preferably a transverse groove as shown in FIG. 3. The post 61 has a circumferential indentation 67 for receiving a locking means 73, in FIG. 5. The locking means 73 has a spring 77 and an engagement aperture 75 which fits over the indentation 67. The spring 77 forces the engagement aperture 75 to engage the indentation 67 and lock against a post end flange 69. The locking means 73 has a button 45 opposite the spring which protrudes from the handle of the strobe 41, as shown in FIG. 6 when engaged. The handle 43 has a diametric bore 46 for placement of the locking mechanism 73. The spring 77 causes the protrusion of the button 45 and engagement of the aperature 75 with the indentation 67 and flange 69; however, a depression of the button 45 disengages the locking means 73. When in place on the platform, the strobe mast 41 abuts the platform at handle end 41 wherein a nesting protrusion 57 engages a nesting means 65, as shown in FIG. 6 and FIG. 3. The protrusion 57 is preferably a rectangular protrusion coincidental to the nesting slot 65 of FIG. 3. The handle 41 incorporates an upper mast locking means 79 for locking the handle and mast together.

FIG. 7 shows a top view of the tray 1 having a quickly detachable strobe end 15 and an second opposite end 13 for attachment of various under water camera attachments. The second platform end 13 incorporates an extension 91 for attachment of a second strobe mast 81, as shown in FIGS. 7 and 8. The extension 91 attaches through matched bores 99 in the tray and the extension wherein a screw 93 extends through the bore 99 and has threads 95 for connecting the extension and the tray. Thus, the tray 1 and the extension 91 have overlapping ends 101, and 103 respectively which form the aforesaid colinear extension. The extension has an upper face 105 for engaging a strobe mast 81. A screw 83 connects the extension 91 to a bore hole 85 drilled in the mast 81.

Also, in FIG. 8, a camera engaging knob 109 has a threaded protrusion 111 for protruding through a camera engaging hole 113. The camera rests upon the tray face 105 and is held by the knob 109 and transverse antislip pads 107. The pads are preferably made of high friction, antislip material such as rubber. Adjacent the camera on the tray and opposite end 13, a face 71 of the detachable strobe side 15 engages the quickly detachable strobe mast 41 through a nesting means 65 and a protruding post 61.

FIG. 9 is the light meter housing 23 mounted upon a mast. The housing has an outer periphery 25 and an inner peripheral groove 125 for engaging the meter. The housing 23 has a separable seam 123 which serves an adjustment mechanism for tightening or loosing the housing on the meter. A screw 119 on one side of the seam works with threads 121 on the opposite side of the seam to widen or constrict the seam and thereby loosen or tighten the grip of the housing on the meter. Further, a connection screw 117 grips the housing to the mast at a bottom end of the protrusion 115 to an end of the mast.

FIG. 10 is an alternate embodiment of the light meter housing 23 incorporating the outer periphery 25, and inner groove 125 and adjustment seam 123 and means 119 and 121 on protrusion 27. Further, the embodiment is preferably constructed so as to engage a camera shoe wherein an engagement platform 133 is mounted on a post 131 protruding from the protrusion 27 wherein a locking means 135 locks the platform 133 into the camera shoe.

While the present invention has herein been described in its preferred mode, it is understood that various modifications would be within the ability of those skilled in the art. Thus the described invention is not to be limited thereto, and said modifications and embodiments are intended to be included within the scope of the appended claims.

I claim:

1. A strobe and tray assembly for an underwater camera comprising:

a generally horizontal tray incorporating a central mounting means for a camera wherein a length of the tray is substantially longer than a length between first and second bottom ends of the camera, therefore, providing portions of the tray projecting perpendicularly and oppositely from the bottom ends of the camera to be mounted on the central mounting means;

the perpendicularly projecting portions of the tray form a first platform on one side of the camera and a second platform on an opposite side of the camera, said platforms incorporating means for removably engaging attachments complementary to an underwater camera;

the first platform in provided with a post protruding perpendicular from the platform and parallel to the central mounting means, therein providing a guiding and clamping means for a removable strobe attachment arm, the platform further incorporating a nesting means adjacent the post for seating a base of the removable strobe attachment arm on to the first platform;

said second platform provided with screw attachment means enabling attachment of an auxiliary attachment arm having means for removably engaging a light meter attachment or a second strobe attachment.

2. The apparatus of claim 1 wherein the strobe attachment arm for connecting to the post on the first platform further comprises a mast having one end for removably mounting a strobe and an opposite handle end incorporating an aperture and a bore for receiving and sliding over the protruding post, wherein the handle end rests on the tray for alignment of the strobe with the camera.

3. The apparatus of claim 2 wherein a locking mechanism is provided between the post and the handle wherein the locking mechanism is automatically releasably engaged when the handle is slid over the post and nested on the tray, said lock being provided with a quick release mechanism on the handle which disengages the lock and allows removal of the strobe attachment arm from the tray.

4. The apparatus of claim 1 further comprising means for removably attaching a light meter, the means having a bracket which surrounds and clamps a light meter; a rigid second mast having two ends, a connection between the meter bracket and a first end of the mast; and a screw fastener for connecting a second end of the mast to the second tray platform.

5. The apparatus of claim 1 further comprising:

a second strobe attachment;

a rigid mast having two ends wherein a first end removably attaches to a strobe and a second end attaches to a tray extender;

said attachment between mast and extender being perpendicular;

said tray extender having an overlapping edge engaging an end of the second platform opposite an abutment with the central mounting means and extending co-linearly therewith; and a screw fastening means attaching the overlapping edge of the extender to the second platform by extending through the end of the second platform.

6. An improved attachment tray for underwater cameras comprising:

a generally horizontal tray having first and second opposite ends and a central portion for mounting a camera and engaging a camera attachment wherein an underwater camera is mounted proximal to the central portion and a length of the tray is greater than a length of a base of the camera, thereby allowing the first and second ends of the tray to protrude from opposite ends of the central portion;

an attachment means for attaching the camera to the tray further comprising a means for engaging a bottom of the camera with the central portion of the tray whereby the first and second ends of the tray protrude substantially perpendicular to the attachment means;

the first and second ends of the tray form first and second platforms for engaging underwater photographic attachments;

an engaging means for removably holding an attachment on the first platform comprising a post protruding upward and substantially perpendicular to the platform, said post incorporating a locking means for removably engaging a corresponding locking means on a first attachment;

the engaging means of first platform further comprising a nesting means for receiving a bottom end of the first attachment for seating said attachment on the platform;

the first attachment comprising a first mast for a strobe having two ends wherein an upper strobe attachment end incorporates a means for removably mounting a strobe and an abutment end prescribes an abutment between the first attachment and said firt platform, the abutment end further comprising a handle integral with attachment mast wherein the handle is of a length longer than a length of the first platform post, the handle further incorporating a bore drilled axially from the abutment end towards the upper strobe attachment end, said bore having a diameter and a bore length substantially equivalent to a diameter and length of the post protruding from the platform for removably engaging the strobe attachment to the first platform;

the engagement of the first platform with the strobe attachment comprising the bore hole for receiving the first platform post wherein the bore hole slips onto the post until the abutment end of the attachment abuts the platform and nests in the nesting means;

the nesting means between the abutment end of the strobe attachment and the first platform comprising a protrusion on the abutment end for engaging a depression formed in a surface of the first platform;

a quick release mechanism incorporated into the attachment handle comprising a means for engaging an indentation on the platform post wherein the locking mechanism is automatically and releasably engaged when the strobe attachment is in place on the platform, said locking mechanism being disengagable by applying pressure to a button located exterior on a surface of the handle.

7. The underwater camera tray of claim 6 further comprising a second platform incorporating plural means for alternatively attaching underwater camera attachments wherein a screw arrangement is threadable through the platform and into a second upwards protruding mast which removably engages a light meter and alternatively the screw arrangement engages a platform extension extending colinearly with the platform away from the second mast, said extension providing a base for removably attaching an upwardly extending underwater camera attachment.

8. The apparatus of claim 6 wherein the mast of the strobe attachment is angled between the handle and the means for removably mounting the strobe.

9. The apparatus of claim 7 wherein the second mast is angled between the second platform or the platform extension and the camera attachment.

* * * * *